May 5, 1970           G. L. GUINOT           3,510,017
EARTHWORKING MACHINE ADAPTER FOR ENABLING
EASY CONNECTION OF VARIOUS WORK TOOLS
Filed Dec. 14, 1967           3 Sheets-Sheet 1

INVENTOR
GABRIEL L. GUINOT
BY Mason, Fenwick & Lawrence
ATTORNEYS

May 5, 1970

G. L. GUINOT 3,510,017

EARTHWORKING MACHINE ADAPTER FOR ENABLING
EASY CONNECTION OF VARIOUS WORK TOOLS

Filed Dec. 14, 1967

INVENTOR
GABRIEL L. GUINOT
BY
Mason, Fenwick & Lawrence
ATTORNEYS

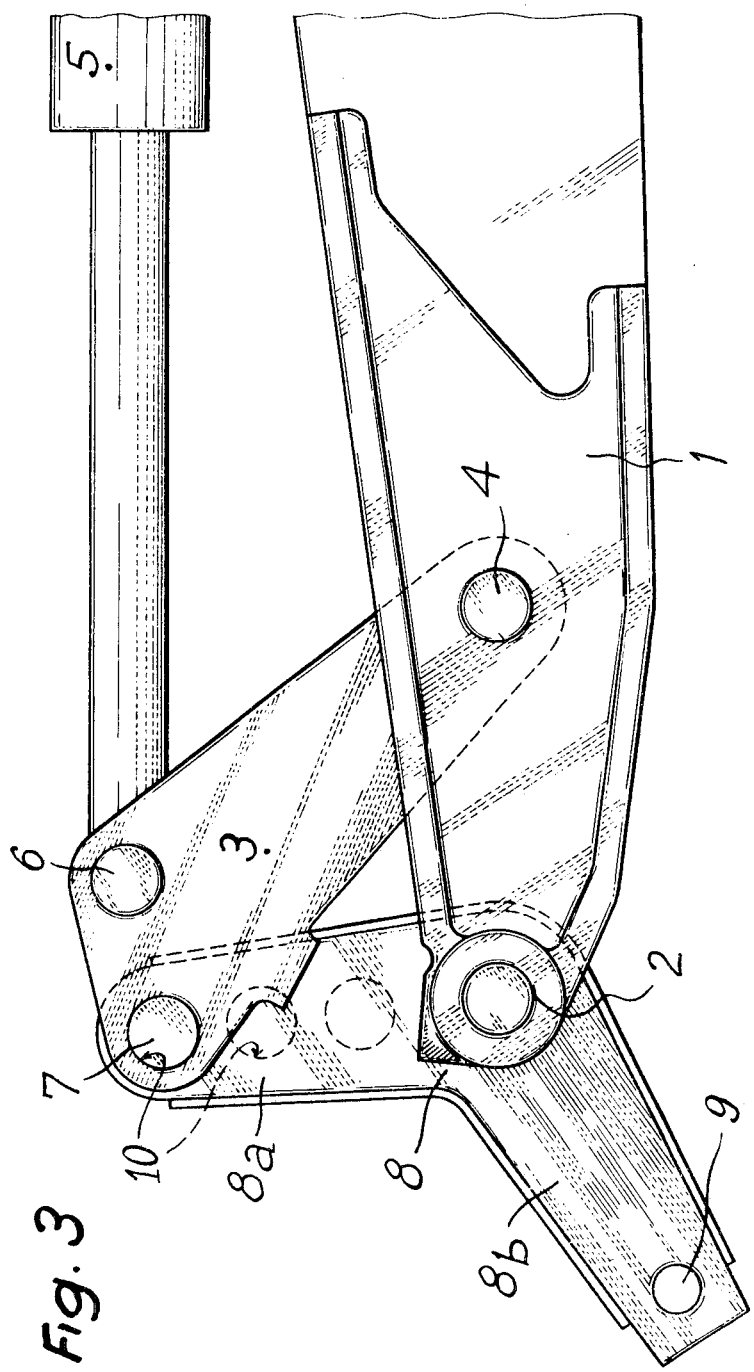

United States Patent Office 3,510,017
Patented May 5, 1970

3,510,017
EARTHWORKING MACHINE ADAPTER FOR ENABLING EASY CONNECTION OF VARIOUS WORK TOOLS
Gabriel L. Guinot, Le Plessis-Belleville, France, assignor to Societe Anonyme Poclain, Le Plessis-Belleville, Val-d'Oise, France, a French society
Filed Dec. 14, 1967, Ser. No. 690,558
Claims priority, application France, Jan. 26, 1967, 92,565
Int. Cl. E02f 3/30, 3/36, 3/80
U.S. Cl. 214—138                                4 Claims

ABSTRACT OF THE DISCLOSURE

In a mechanical earth working machine designed to operate either with an earth working implement such as a drag bucket controlled by an hydraulic ram and lever mechanism, or a different form of earth working implement, such as a grab, not requiring said hydraulic ram and lever mechanism, the provision of an attachment which not only immobilises the hydraulic ram and lever mechanism but also forms a means for attaching an earth working implement which does not require such ram and lever mechanism.

---

Figure 1:
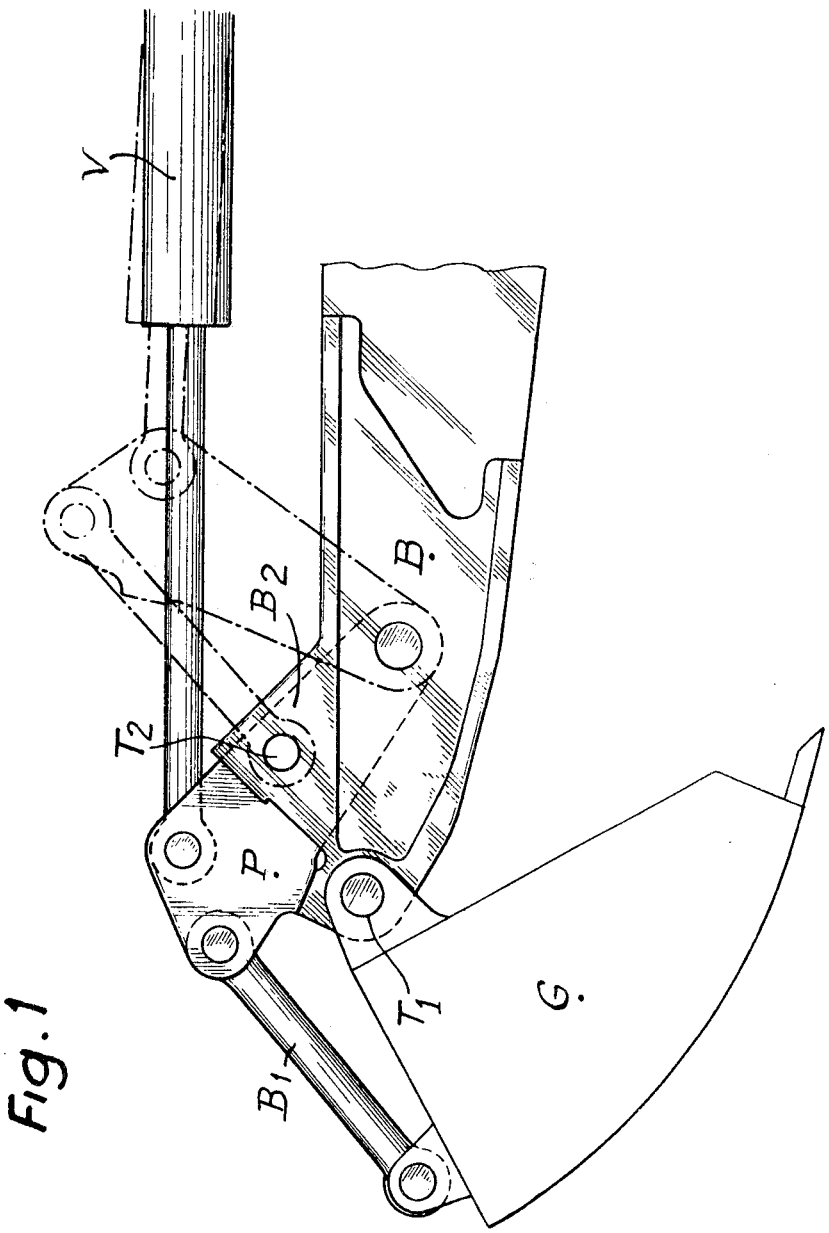

This invention relates to mechanical earth working machines, such as mechanical excavators, capable of operating with different exchangeable earth working implements such as mechanical grabs or mechanical drag buckets or shovels. Such earthworking machines comprise a beam articulated to a jib and having at its outer free end means for pivotally attaching thereto a drag bucket or shovel and hydraulically actuating means for operating said drag bucket or shovel, said hydraulically operated means including a lever pivotally mounted at one of its ends to said articulated beam and having pivotally attached to its other end the piston rod of an hydraulic ram and a connecting rod also pivotally connected to said drag bucket or shovel to impart pivotal movement thereto.

When it is desired to substitute a mechanical grab for the drag bucket or shovel it is necessary to disconnect the drag bucket or shovel from its pivotal connection with the beam and disconnect from the drag bucket or shovel the connecting rod which imparts pivotal movement thereto, and to immobilise said connecting rod and the hydraulic ram and its operating lever mechanism (which is not required for operating a mechanical grab). This is effected by connecting the free end of the connecting rod, previously disconnected from the drag bucket or shovel, to a lug or boss especially provided on the beam and to rigidly attach to the beam an arm or like attachment for supporting the grab.

The above described arrangement has certain constructional disadvantages, for example it necessitates providing the articulated beam with a special lug or boss for attaching the connecting rod and also necessitates relatively complicated means for attaching to the articulated beam the grab supporting arm or like attachment having regard to the weight said arm or like attachment has to support.

The object of the present invention is to eliminate the above stated disadvantages and with this object in view the mechanical earth working machine according to the invention is provided with means for both immobilising the hydraulically actuated means and supporting a grab when the grab is exchanged or substituted for a drag bucket or shovel.

According to another aspect of the invention the mechanical earth working machine comprises a jib, a beam for attaching either a grab or a drag bucket or shovel on said articulated beam, a lever pivotally mounted on said beam and pivotable by an hydraulic ram to actuate a drag bucket or shovel when attached to said beam, and means for immobilising said pivotable lever and said ram when a grab is substituted for a drag bucket or shovel, wherein said means comprises an attachment for connection with said beam and said pivotable lever thereby to immobilise said lever and ram and having means for attaching a grab thereto.

Figure 2:
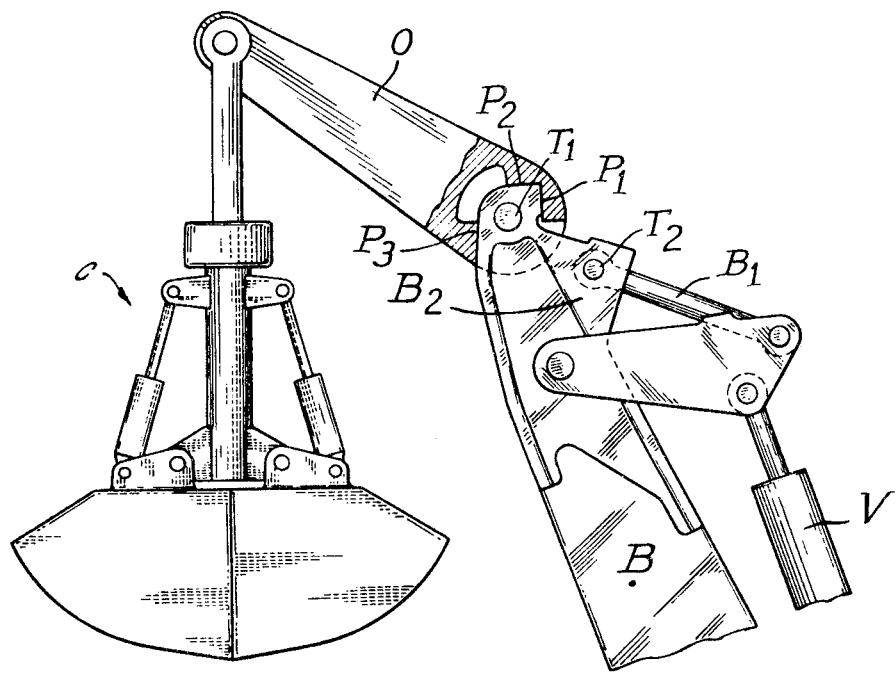

In order that the invention may be more clearly understood one particular embodiment thereof will now be described, by way of example, with reference to the accompanying drawings in which:

FIGS. 1 and 2 are side elevations of the hitherto known arrangement for attaching different forms of earth working implements to the articulated beam of a mechanical earth working machine, and FIG. 3 is a similar view of an embodiment according to the present invention.

Referring to FIG. 1 of these drawings the known construction of mechanical earth working machines comprises a beam B articulated to the jib (not shown) of the machine and having at its outer free end a hole for receiving a pivot pin $T_1$, for pivotally mounting a drag bucket or shovel G thereto. The drag bucket or shovel is connected by a connecting rod $B_1$ to a lever P which is pivotally attached to the beam B and connected with the piston rod of an hydraulic ram V. As will be understood operation of the ram V will effect pivotal movement of the drag bucket or shovel G about its pivot $T_1$.

When it is desired to substitute or exchange a grab C (FIG. 2) for a drag bucket or shovel G (FIG. 1) it is necessary to disconnect the drag bucket or shovel from the beam B and from the connecting rod $B_1$ and immobilise the connecting rod and the hydraulic ram V and lever P (which are not required for operating a grab) and attach to the beam B an arm O or like attachment for supporting the grab C. In order to immobilise the ram V, lever P and connecting rod $B_1$, the free end of said connecting rod is attached to a lug or boss $B_2$, especially provided on the beam B for that purpose, thus locking the parts V, P and $B_1$ in the position shown in chain dotted lines in FIG. 1 and in full lines in FIG. 2. Having thus immobilised the ram V, lever P and connecting rod $B_1$ a grab supporting arm O is connected to the end of the beam B utilising the hole from which the drag bucket or shovel was previously supported at $T_1$. By reason of the weight the arm O is required to support it is necessary for it to be very rigidly and securely attached to the beam B without any risk of pivotal movement about the axis $T_1$. For this purpose said arm is provided with bearing surfaces $P_1$, $P_2$ and $P_3$ which bears against corresponding bearing surfaces at the end of the beam B.

Referring now to FIG. 3 the articulated beam 1 is provided with a hole 2 at its free end for the pivotal mounting of a drag bucket or shovel and with a pivoted lever 3, pivoted to the beam 1 at 4, for connection at 6 with the piston rod of an hydraulic ram 5 and at 7 with the connecting rod of the drag bucket or shovel, all as in the known construction according to FIGS. 1 and 2. According to the present invention however, the means for immobilising the ram 5 and operating lever 3, when a grab instead of a drag bucket or shovel is to be attached to the beam, comprises an attachment 8 in the form of a two-armed member. The arms 8a and 8b of the two-armed member 8 extend at an angle of between 90° and 180° to each other but preferably at an angle of about 120° as in the embodiment illustrated. This two armed member is provided at the junction of its two arms 8a, 8b with a hole 2 for attaching it by means of a pin to the beam 1 at the same point at which the drag bucket or shovel was previously attached. At the outer free end of the arm 8a is a hole 10 for connecting it by means of a pin 7 to the same point of the operating lever 3 at which the connecting rod of the drag bucket or shovel was previously attached. It will be understood that when secured to the beam 1 and lever 3 as above described the lever 3 and the piston rod of the ram 5 will be locked in the position shown in FIG. 3, and thus immobilised, whereupon a grab such as C of FIG. 2 can be attached to the free end of the arm 8b of the attachment 8 which is provided with a hole 9 for this purpose.

For the purpose of permitting adjustment of the angle of inclination of the arm 8b of the attachment 8 the arm 8a may be provided with a plurality of holes 10, as shown in dotted lines, for attaching the arm 8a to lever 3.

It will be understood that by virtue of the present invention is is not necessary to provide the beam 1 with a special lug or boss, such as $B_2$ in FIG. 1, for the attachment of the connecting rod $B_1$ of a drag bucket or shovel since said connecting rod is removed with the drag bucket or shovel when a grab is to be used. Furthermore, a special grab supporting arm O (FIG. 2) becomes superfluous and it therefore becomes unnecessary to provide special beaming surfaces such as $P_1$, $P_2$ and $P_3$ between such arm and the articulated beam B. Thus the construction of the various parts is considerably simplified and consequently manufacturing costs correspondingly reduced.

The attachment 8 need not necessarily consist of a two-armed angle member as illustrated but may be varied in shape and size according to the type of grab it is to support. It must also be understood that the invention is not limited to use with the particular form of drag bucket and grab illustrated, the term "drag bucket" being intended to include any form of implement requiring ram actuating means to operate it and the term "grab" is to be understood as including any implement used for the same or a similar purpose without requiring the ram actuating means described.

I claim:

1. A mechanical earthworking machine comprising a beam articulated to a jib of the machine, means for selectively attaching different forms of earth working implements such as drag buckets and grabs on said articulated beam, a lever pivotally mounted on said beam and pivotable by an hydraulic ram to actuate one form of earth working implement, such as a drag bucket when attached to said beam, and means for immobilising said pivotable lever and said hydraulic ram with respect to said beam when a second form of earth working implement, such as a grab not requiring said hydraulic ram and pivotal lever, is attached to said articulated beam, said ram and lever immobilising means comprising a rigid attachment having a rigid member connectable between said beam and said pivotable lever, thereby to immobilise said ram and lever and also having a second rigid member to which said other form of earth working implement is connected for use.

2. A mechanical earth working machine according to claim 1, wherein said ram and lever immobilising means comprises a two-armed member in which each arm respectively comprises one of said rigid members wherein said arms extend at an angle to each other and including means at the junction of said two arms for enabling attachment of said two-armed member to said articulated beam and means at the end of one of said arms for attaching that arm to said pivotable lever and means at the free end of the other arm for attaching said second form of earthworking implement thereto.

3. A mechanical earth working machine according to claim 2, wherein the arms of said two-armed member extend at an angle of between 90° and 180° to each other.

4. In a mechanical earthworking machine, the combination of a beam articulated to a supporting machine, a first pivot means on its extreme outer end of said beam, a second pivot means adjacent the outer end of said beam but spaced inwardly from said first pivot means, lever means pivotally connected to said beam by said second pivot means, a hydraulic ram connected to the outer end of said lever means opposite the connection of said lever means to said second pivot means, a unitary earth working implement supporting member formed of first and second arms extending outwardly with respect to each other from a connector portion connectable to said first pivot means and having means on the end of one arm directly connected to said lever means on the end of said lever means said ram is connected for completely immobilizing said lever means and said ram so that said beam, said ram and said implement supporting member form a unitary rigid frame in which the parts are not movable with respect to each other end attachment enabling means on the end of the other arm for enabling attachment of an earth working tool of one type to said implement supporting member.

References Cited

UNITED STATES PATENTS

| | | |
|---|---|---|
| 2,764,306 | 9/1956 | Dorkins. |
| 2,828,038 | 3/1958 | Dorkins _____ 37—187 XR |
| 3,116,845 | 1/1964 | Holopainen _____ 214—145 |

ROBERT E. PULFREY, Primary Examiner

C. D. CROWDER, Assistant Examiner

U.S. Cl. X.R.

37—118, 186; 214—145, 147